Patented Aug. 16, 1927.

1,639,027

UNITED STATES PATENT OFFICE.

ALFRED G. DOE, OF QUINCY, MASSACHUSETTS, ASSIGNOR TO AMERICAN BOILER LIFE COMPANY, INC., OF BOSTON, MASSACHUSETTS, A CORPORATION OF MASSACHUSETTS.

ANTISCALE MATERIAL FOR BOILERS.

No Drawing.   Application filed April 27, 1921. Serial No. 465,018.

This invention has for its object to provide an antiscale material in dry or powdered form, which is highly efficient for preventing the formation of scale in new boilers and for removing the scale and oil from old boilers, which latter may be of any of the types now commonly used and such for instance as return tubular, water tube, locomotive or marine boilers.

The invention further has for its object to provide a dry or powdered antiscale material, which is not only highly efficient but also inexpensive, and one which does not follow the steam and therefore does not cause foaming with the attending disadvantages resulting therefrom.

To this end, I employ material in such state of fineness as to be capable of remaining in suspension in the boiler water to circulate therewith and be brought into contact with the boiler having scale thereon.

Such material can be obtained commercially from phosphate rock commonly used in the manufacture of fertilizers.

In the manufacture of fertilizers from phosphate rock, the latter is ground sufficiently fine to pass through a sieve of a mesh ranging from 40 to 60. In the grinding operation, portions of the rock are ground into the form of a very fine powder or dust which is blown off from the grinding mill and collected as dust in a suitable apparatus. This fine dust is now commonly known as "phosphate rock floats" and is regarded as waste material by the fertilizer manufacturer.

In accordance with this invention I have discovered and have demonstrated by a series of tests on a practical scale that the finely divided powder or phosphate rock floats possesses the property of very effectively removing the scale and oil from old boilers and also of preventing the formation of scale in new boilers.

The powdered material or "floats" is somewhat slow in mixing with water as it is very light and has a tendency to float on the water, and therefore it is preferred to add thereto before the powder is supplied to the boiler, a material which will facilitate the mixing of the powder with the water, and also place the powder in such condition as to avoid any danger of its following the steam and cause foaming of the boiler.

A suitable material for this purpose and one which I prefer to use is a light mineral oil, known to the trade as a "light spindle oil."

This light mineral oil may be used in amounts varying from two to ten per cent, and it is preferred to use about two per cent of the oil on account of the cost and also as this amount of oil has been found to be sufficient to effectively mix the phosphate rock floats with the water in the boiler and does not cause the latter to foam.

The anti-scale material appears to act upon the scale in the following manner. First, it attacks the scale at the hottest part of the boiler, and as it works through the cracks in the scale and comes into contact with the hot metal, it expands and lifts the scale away from the metal and breaks off the scale, which is subsequently removed by blowing off the boiler. Where it cannot work through the scale, it attacks the latter and wears it off, but whether the removal of the scale in such cases is by chemical or mechanical action or by both, I am unable at this time to state.

When used in new boilers, the antiscale material will not only render harmless the calcium and magnesium salts in the feed water but will prevent oil and grease in the water from adhering to and settling on the metal of the boiler.

In operation upon a boiler which has a heavy scale, I have used the anti-scale material in about the following amounts, to wit: from 7½ to 10 lbs. per day for 40 days in a 100 H. P. boiler, and from 12 to 15 lbs. in a 200 H. P. boiler for the same time, and in a 300 to 500 H. P. boiler about 20 lbs. per day. At the end of this period of time, the boiler was found to have been cleaned from scale wholly or to such extent, that in the continued use of the boiler the maximum amount of the powder or dust necessary to keep the boiler free or substantially free from scale would be about 1 lb. daily for each 100 H. P.

The amounts above specified have been found sufficient to do the work effectively in the time specified at a minimum cost, but it is not desired to limit the invention to the particular amounts specified.

While it may be preferred to dose the boiler in one lb. lots per day while the boiler is in operation, after the scale has once been removed, it may be dosed in larger quantities sufficient to cover a given period of time, such, for instance, as a week, using the aggregate of one lb. per day or 7 lbs. for the period of each week, at the convenience of the engineer.

The anti-scale material above mentioned and with which most excellent results have been obtained, contained about 88% phosphate of lime, 8% of carbonate of lime and about 2% of light mineral oil, and while it may be preferred to use these materials in about the proportions specified, not only on account of the results produced in the boiler, but also because of the cost, which is sufficiently low to make the anti-scale material attractive to engineers, it is not desired to limit the invention to the particular proportions specified.

Claims.

1. An anti-scale material for boilers composed of phosphate rock floats.

2. An anti-scale material for boilers composed of phosphate rock floats and a relatively small quantity of light mineral oil.

In testimony whereof, I have signed my name to this specification.

ALFRED G. DOE.